United States Patent
Ishioka

(10) Patent No.: US 7,688,557 B2
(45) Date of Patent: Mar. 30, 2010

(54) CONTROL APPARATUS FOR TRANSMISSION MECHANISM, TRANSMISSION, VEHICLE PROVIDED THEREWITH, METHOD OF CONTROLLING THE TRANSMISSION MECHANISM, AND METHOD OF ESTIMATING HEAT VALUE OF ELECTRIC MOTOR IN THE TRANSMISSION MECHANISM

(75) Inventor: Kazutoshi Ishioka, Shizuoka (JP)

(73) Assignee: Yamaha Hatsudoki Kabushiki Kaisha, Iwata-shi (JP)

(*) Notice: Subject to any disclaimer, the term of this patent is extended or adjusted under 35 U.S.C. 154(b) by 289 days.

(21) Appl. No.: 12/021,914

(22) Filed: Jan. 29, 2008

(65) Prior Publication Data
US 2008/0211444 A1  Sep. 4, 2008

(30) Foreign Application Priority Data
Jan. 31, 2007 (JP) ............... 2007-022217
Oct. 25, 2007 (JP) ............... 2007-277115

(51) Int. Cl.
H02H 5/04 (2006.01)
H02H 7/08 (2006.01)

(52) U.S. Cl. ............ 361/29; 477/72; 180/65.7; 701/22; 701/51; 903/917; 318/434

(58) Field of Classification Search .......... 318/434; 903/917; 361/29; 180/65.7; 701/22, 51; 477/72
See application file for complete search history.

(56) References Cited

U.S. PATENT DOCUMENTS

| 5,846,157 | A  | * | 12/1998 | Reinke et al. ............ 477/48 |
| 6,101,144 | A  | * | 8/2000  | Jo ......................... 365/229 |
| 6,157,884 | A  | * | 12/2000 | Narita et al. ............ 701/51 |
| 6,292,730 | B1 | * | 9/2001  | Takizawa et al. ........ 701/51 |
| 6,292,741 | B1 | * | 9/2001  | Bitzer et al. ............ 701/115 |
| 6,549,840 | B1 | * | 4/2003  | Mikami et al. .......... 701/69 |
| 6,597,976 | B2 | * | 7/2003  | Reuschel et al. ........ 701/51 |
| 6,881,167 | B2 | * | 4/2005  | Inada ..................... 475/5 |
| 6,913,316 | B2 | * | 7/2005  | Kinoshita et al. ....... 297/300.3 |
| 2007/0080004 | A1 | * | 4/2007 | Pfund .................... 180/65.2 |

FOREIGN PATENT DOCUMENTS

JP  2004-019740  1/2004

* cited by examiner

Primary Examiner—Rita Leykin
(74) Attorney, Agent, or Firm—Rabin & Berdo, PC

(57) ABSTRACT

A motorcycle has a transmission including a transmission mechanism and an electronic control unit (ECU). The transmission mechanism includes a crankshaft as an input shaft, a driven shaft as an output shaft and an electric motor. The electric motor changes continuously the transmission ratio between the crankshaft and the driven shaft. The ECU estimates the heat value of the motor from a rate of change in the transmission ratio. When the estimate heat value reaches or exceeds a specified value the electric motor is restricted or stopped.

19 Claims, 9 Drawing Sheets

CONTROL APPARATUS FOR TRANSMISSION MECHANISM, TRANSMISSION, VEHICLE PROVIDED THEREWITH, METHOD OF CONTROLLING THE TRANSMISSION MECHANISM, AND METHOD OF ESTIMATING HEAT VALUE OF ELECTRIC MOTOR IN THE TRANSMISSION MECHANISM

RELATED APPLICATIONS

This application claims the benefit of priority under 35 USC 119 of Japanese patent application no. 2007-022217, filed on Jan. 31, 2007, and Japanese patent application no. 2007-277115, filed on Oct. 25, 2007, which applications are hereby incorporated by reference in their entireties.

BACKGROUND OF THE INVENTION

1. Field of the Invention

This invention relates to a control apparatus and method for a transmission mechanism for a vehicle provided with the transmission, and a method of estimating the heat value of an electric motor.

2. Description of Related Art

An electronically, continuously variable transmission (ECVT) is known in which a transmission ratio may be changed continuously using an electric motor (see JP-A-2004-19740, for example.).

In an ECVT, the electric motor is driven in reverse relatively often due to changes in transmission ratio. As a result, a relatively large amount of heat is generated, leading to temperature rise in the electric motor and its driving circuit, and to the possibility of deterioration in motor performance.

Therefore, the motor temperature or heat value is preferably monitored so that the motor temperature does not exceed a permissible use temperature range. For example, a method of estimating the motor temperature is conceivable in which temperature sensors are provided on the motor, its driving circuit etc. Because the heat value of the motor is in proportion to the square of the current flowing through the motor, another conceivable method is to provide a current sensor to measure the current flowing through the motor, and estimate the heat value from the measured current.

The methods mentioned above, however, require separate temperature and current sensors to be provided. As a result, constitution and control of the ECVT is undesirably complicated.

SUMMARY OF THE INVENTION

This invention has been made in view of the above points and provides a transmission where the heat value of the electric motor is estimated with a simple constitution.

Incidentally, while the invention is explained using an ECVT as an example, the invention is applicable to transmissions in general that change transmission ratio using an electric motor.

A control apparatus of the invention comprises a continuously variable transmission mechanism having an electric motor for changing continuously a transmission ratio between input and output shafts. The control apparatus estimates the heat value of the electric motor based on the rate of change in the transmission ratio.

A continuously variable transmission of the invention comprises a continuously variable transmission mechanism and a control section. The continuously variable transmission mechanism includes an electric motor that changes a transmission ratio continuously between input and output shafts. The control section estimates the heat value of the electric motor on the basis of the rate of change in the transmission ratio.

A vehicle of the invention includes the continuously variable transmission described above.

A control method of the invention controls a continuously variable transmission mechanism having an electric motor for changing continuously a transmission ratio between input and output shafts by estimating a heat value of the electric motor from the rate of change in the transmission ratio.

In a method of estimating a heat value of an electric motor in a continuously variable transmission having an electric motor for changing continuously a transmission ratio between input and output shafts according to the invention, the heat value of the electric motor is estimated from the rate of change in the transmission ratio.

This invention provides a transmission in which the heat value of the electric motor is estimated with a simple constitution.

Other features and advantages of the invention will be apparent from the following detailed description, taken in conjunction with the accompanying drawings which illustrate, by way of example, various features of embodiments of the invention.

DETAILED DESCRIPTION OF THE INVENTION

First Embodiment

General Description of this Embodiment

The inventor as a result of eager study found a correlation between the heat value of an electric motor and the rate of change in a transmission ratio and developed this invention.

An embodiment of the invention is described in detail below using a motorcycle 1 as an example. While a scooter type motorcycle is described, the invention is not limited to a scooter type motorcycle and may be, for example, an off-road type, motorcycle type, scooter type, or moped type. Further, the invention may be applied to a straddle type vehicle other than a motorcycle such as an all-terrain vehicle (ATV). Furthermore, the invention may be applied to a vehicle other than a straddle type vehicle such as a four-wheeled vehicle.

Detailed Description of Motorcycle 1 According to the Embodiment (General constitution of Motorcycle 1)

Figure 1:
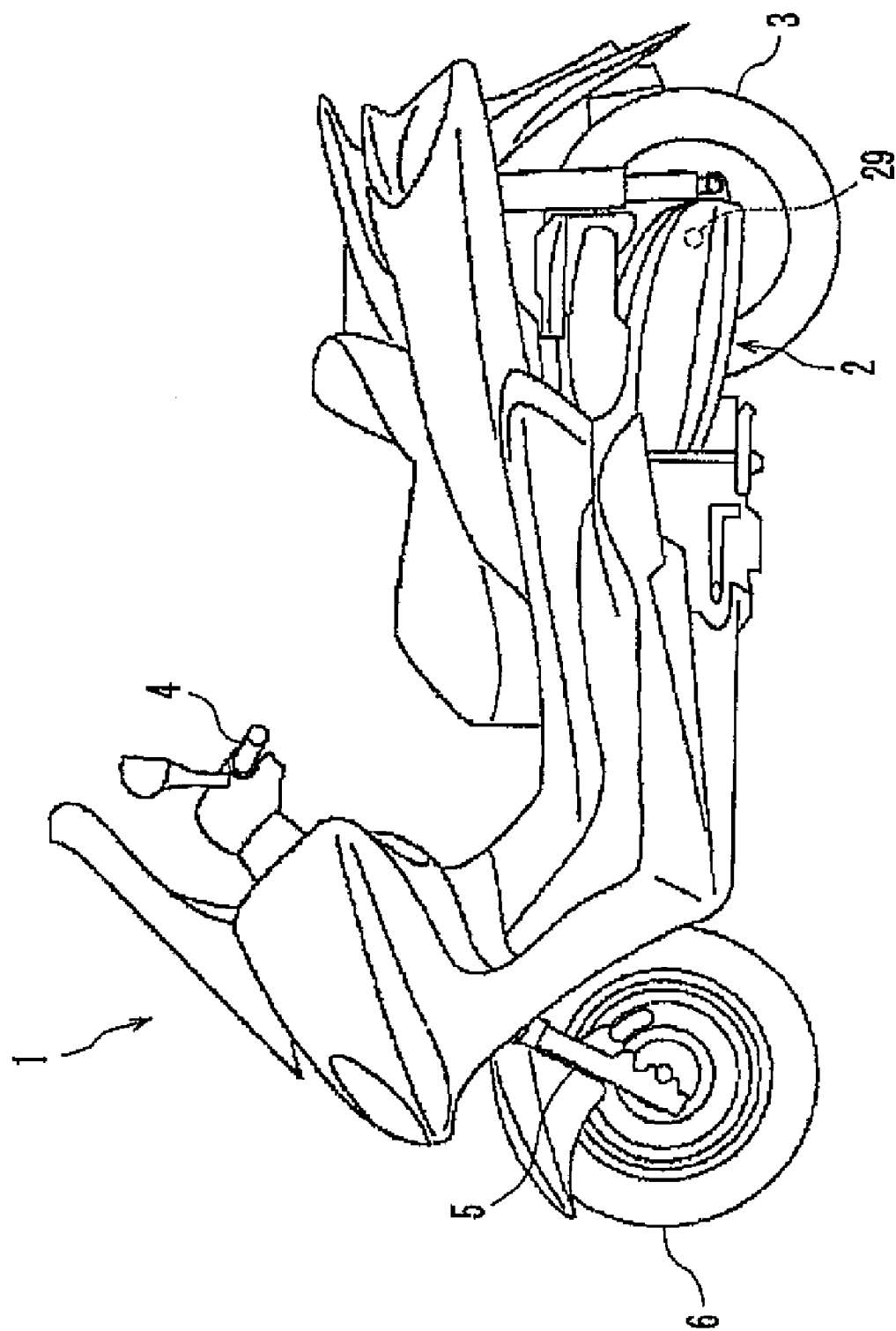
FIG. 1 is a side view of a motorcycle to which the invention is applied.

FIG. 1 is a side view of motorcycle 1. An engine unit 2 is mounted on a body frame. A rear wheel 3 attached to the rear part of engine unit 2 is the driving wheel driven with engine unit 2.

A front fork 5 is connected to a lower end of a head pipe extending downward from handlebars 4. A front wheel 6 attached for rotation to the lower end of front fork 5 is not connected to engine unit 2 and is a wheel for free rotation.

(Constitution of Engine Unit 2)

The constitution of engine unit 2 is now described with reference to FIGS. 2 and 3.

(Constitution of Engine 10)

Figure 2:
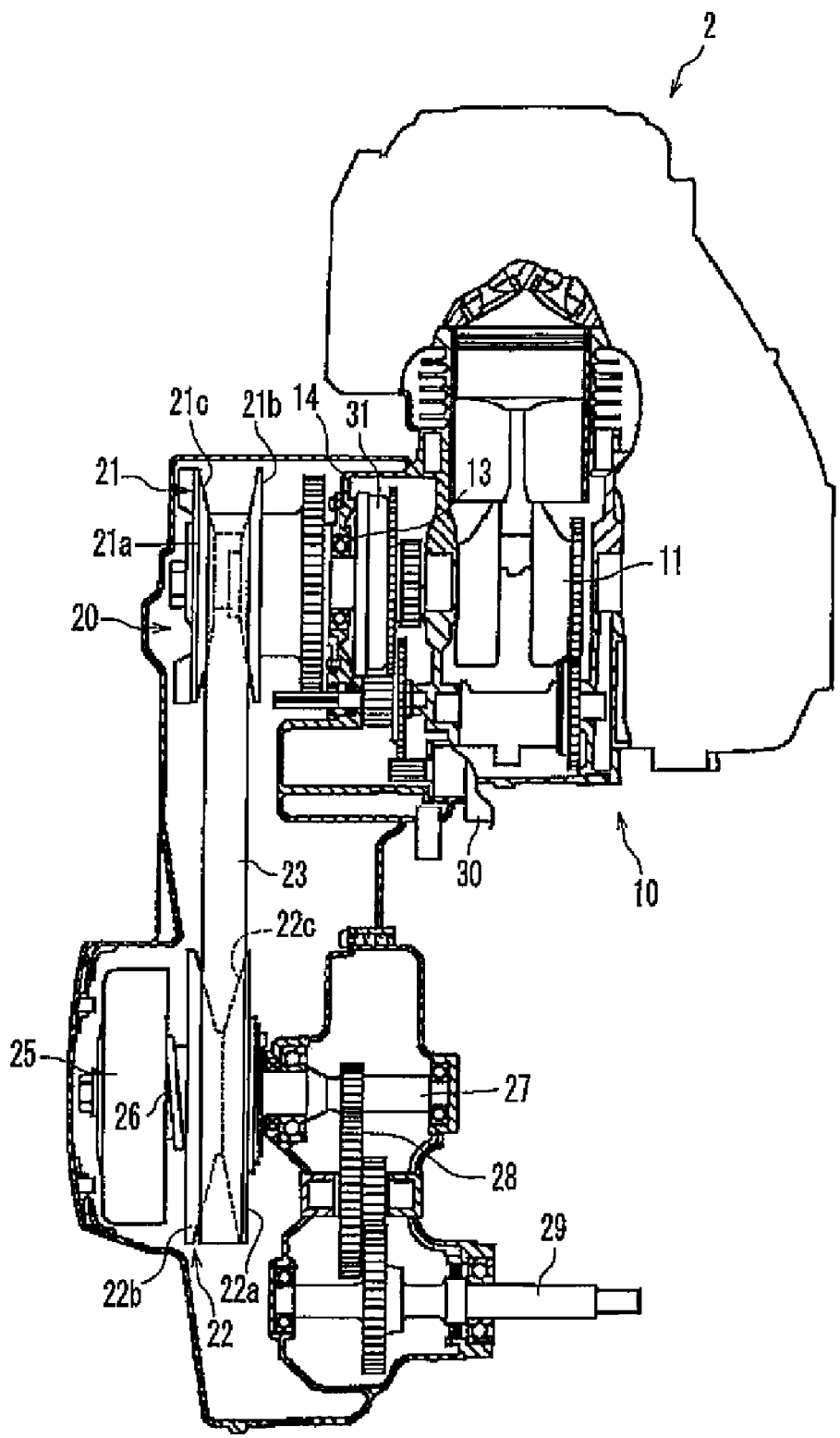
FIG. 2 is a sectional view of an engine unit of the motorcycle.
Figure 3:
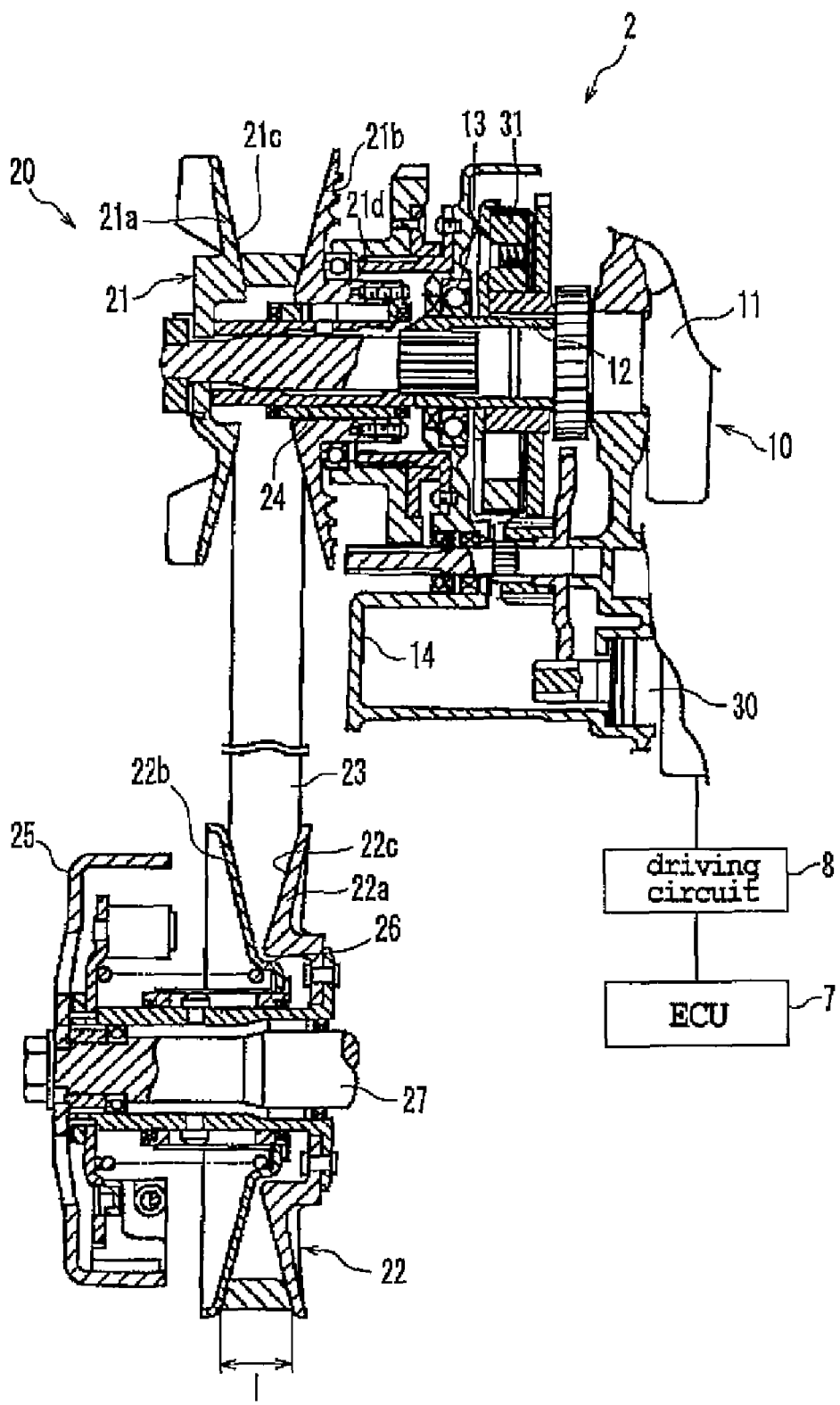
FIG. 3 is a partial sectional view of an ECVT of the engine unit.

As shown in FIGS. 2 and 3, engine unit 2 includes an internal combustion engine 10 and a transmission 20. In this embodiment, engine 10 is described as a forced air-cooled, four-stroke cycle engine. However, engine 10 may be of other types, such as a water-cooled type or a two-stroke cycle type.

As shown in FIG. 3, engine 10 has a crankshaft 11. A sleeve 12 is brought into spline engagement with the outer circumference of crankshaft 11. Sleeve 12 is supported for rotation by a housing 14 through a bearing 13. A one-way clutch 31 connected to an electric motor 30 is attached around sleeve 12.

(Constitution of Transmission 20)

Transmission 20 is made up of a transmission mechanism 20a and an ECU 7 as a control section for controlling transmission mechanism 20a. In this embodiment, transmission mechanism 20a is described as a belt type ECVT. The belt of ECVT may be a resin belt, a metal belt or any other belt. Further, transmission mechanism 20a is not limited to a belt type ECVT and may be, for example, a toroidal type ECVT. Further, transmission mechanism 20a may be of a type other than an ECVT.

Transmission mechanism 20a has a V belt 23 wound around a primary sheave 21 and a secondary sheave 22. V belt 23 has a generally V-shape cross section.

Primary sheave 21 rotates integrally with crankshaft 11 and consists of a stationary sheave half 21a and a movable sheave half 21b. Stationary sheave half 21a is secured to one end of crankshaft 11. Movable sheave half 21b opposes stationary sheave half 21a and is movable in the axial direction of crankshaft 11. Opposing surfaces of stationary sheave half 21a and movable sheave half 21b form a belt groove 21c in which V belt 23 runs. Belt groove 21c becomes wider toward radially outer side of primary sheave 21.

As shown in FIG. 3, movable sheave half 21b is provided with a cylindrical boss part 21d through which crankshaft 11 passes. A cylindrical slider 24 is secured to the inside of boss part 21d. Slider 24 and movable sheave half 21b form an integral body that is movable in the axial direction of crankshaft 11. Therefore, the groove width of belt groove 21c is variable.

The groove width of belt groove 21c of primary sheave 21 is varied as movable sheave half 21b is driven in the axial direction of crankshaft 11 by electric motor 30. In this embodiment, electric motor 30 is driven by PWM (pulse width modulation). However, the driving type of electric motor 30 is not limited and may be, for example, a stepper motor.

Secondary sheave 22 is arranged behind primary sheave 21 and is attached through a centrifugal clutch 25 to a driven shaft 27. Secondary sheave 22 comprises a stationary sheave half 22a and a movable sheave half 22b. Movable sheave half 22b opposes stationary sheave half 22a and is movable in the axial direction of driven shaft 27. Opposing surfaces of stationary sheave half 22a and movable sheave half 22b form a belt groove 22c in which V belt 23 runs. Belt groove 22c becomes wider toward radially outer side of secondary sheave 22.

Movable sheave half 22b is biased by a spring 26 in a direction for decreasing the groove width of belt groove 22c. Therefore, as electric motor 30 is driven, and the groove width of belt groove 21c decreases, the curve radius of V belt 23 on primary sheave 21 increases, and V belt 23 on secondary sheave 22 side is drawn radially inward. As a result, movable sheave half 22b moves against the force of spring 26 in the direction for widening belt groove 22c. As a result, the curve radius of V belt 23 running on secondary sheave 22 decreases, so that the transmission ratio of transmission mechanism 20a varies.

Centrifugal clutch 25 is engaged or disengaged according to the rotational speed of stationary sheave half 22a. That is, when the rotational speed of stationary sheave half 22a is below a specified value, centrifugal clutch 25 is disengaged and rotation of stationary sheave half 22a is not transmitted to driven shaft 27. On the other hand, when the rotational speed of stationary sheave half 22a reaches or exceeds a specified rotational speed, centrifugal clutch 25 is engaged and rotation of stationary sheave half 22a is transmitted to driven shaft 27.

Driven shaft 27 is connected though a speed reduction mechanism 28 to a wheel shaft 29 attached to rear wheel 3. Thus, as driven shaft 27 rotates, rear wheel 3 rotates together with wheel shaft 29.

(Control System for Motorcycle 1)

Figure 4:
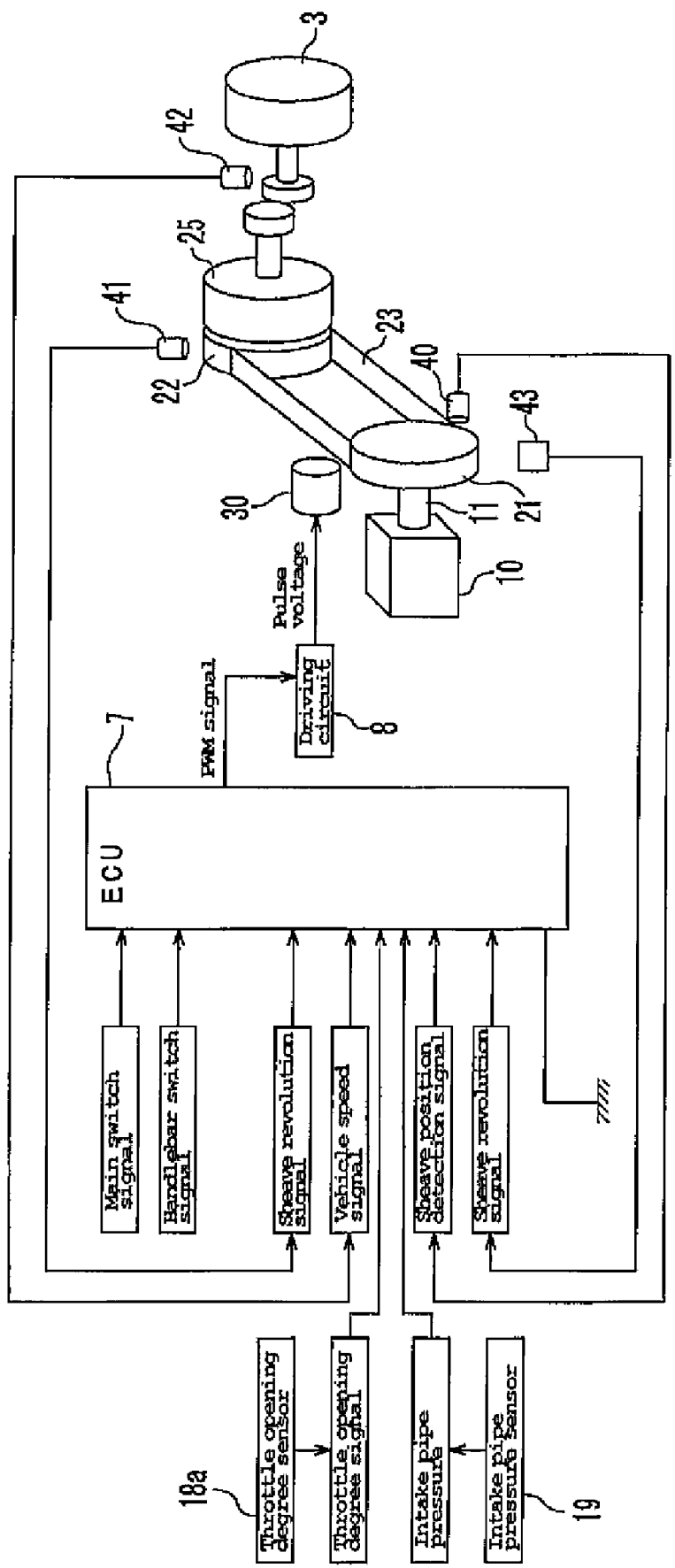
FIG. 4 is a block diagram of a control system of the motorcycle.

The control system for motorcycle 1 is now described in reference to FIG. 4.

(General Description of the Control System for Motorcycle 1)

As shown in FIG. 4, ECU 7 is connected to a sheave position sensor 40 that detects the position of movable sheave half 21b of primary sheave 21 relative to stationary sheave half 21a. In other words, sensor 40 detects the distance (l) between stationary sheave half 21a and movable sheave half 21b in the axial direction of crankshaft 11 and outputs the detected distance (l) as a detected sheave position signal to ECU 7. Sheave position sensor 40 may be, for example, a potentiometer or the like.

ECU 7 is also connected to a primary sheave rotational speed sensor 43, a secondary sheave rotational speed sensor 41 and a vehicle speed sensor 42. Primary sheave rotational speed sensor 43 detects the rotational speed of primary sheave 21 and outputs the detected rotational speed of primary sheave 21 as a sheave rotational speed signal to ECU 7. Secondary sheave rotational speed sensor 41 detects the rotational speed of secondary sheave 22 and outputs the detected rotational speed of secondary sheave 22 as a sheave rotational speed signal to ECU 7. Vehicle speed sensor 42 detects the rotational speed of rear wheel 3 and outputs a vehicle speed signal according to the detected rotational speed to ECU 7.

A handlebar switch attached to steering handlebars 4 outputs a handlebar switch signal to ECU 7 when operated. A throttle opening degree sensor 18a outputs a throttle opening degree signal to the ECU 7.

(Controlling Transmission Mechanism 20a)

Figure 5:
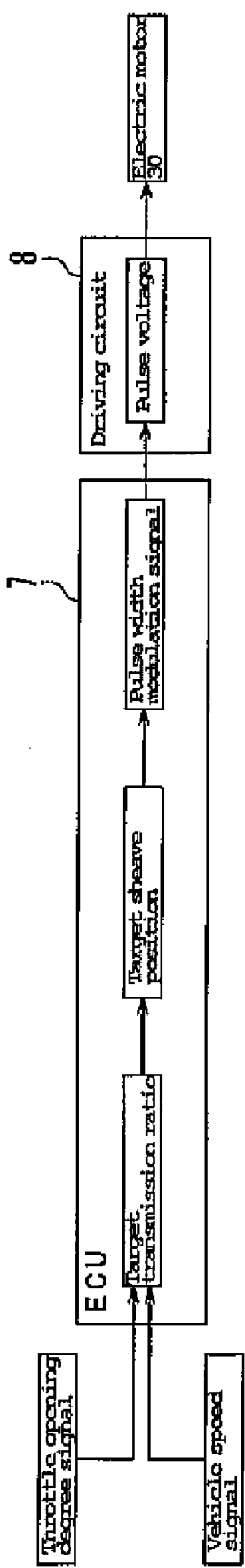
FIG. 5 is a block diagram showing sheave position control of the invention.

ECU 7 performs feedback control of the sheave position of movable sheave half 21b of primary sheave 21 according to the vehicle speed signal and so forth. In other words, ECU 7 performs feedback control of the distance (1) according to the vehicle speed signal and so forth. Specifically, as shown in FIG. 5, a target transmission ratio is determined in ECU 7 from the throttle opening degree and the vehicle speed. ECU 7 calculates the sheave target position from the determined target transmission ratio. In other words, ECU 7 calculates the target distance l between movable sheave half 21*b* and stationary sheave half 21*a* from the determined target transmission ratio. In order to move movable sheave half 21*b* to the sheave target position, ECU 7 outputs a pulse width modulation (PWM) signal corresponding to the present position of movable sheave half 21*b* and the sheave target position to a driving circuit 8. Driving circuit 8 applies an impulse voltage corresponding to the PWM signal to electric motor 30. As a result, movable sheave half 21*b* is driven to adjust the transmission ratio.

(Estimating the Heat Value of Electric Motor 30)

A method of estimating the heat value of electric motor 30 is now described. First, before describing a concrete method of estimating the heat value of electric motor 30, the principle of the method is described.

(Principle of Estimating the Heat Amount Generated by Electric Motor 30)

The inventor as a result of eager study found a correlation between the heat value of electric motor 30 and the rate of change in the transmission ratio of transmission mechanism 20*a*. Specifically, the inventor discovered correlation between the heat amount and the rate of change in the transmission ratio of transmission mechanism 20*a* as a result of the findings enumerated below:

1) The heat value of electric motor 30 is in linear correlation to the square of part of effective voltage applied to electric motor 30 that contributes to heat generation by electric motor 30.

2) The amount of voltage contributing to heat generation by electric motor 30 is determined by subtracting the induced voltage for moving movable sheave half 21*b* from the effective voltage applied to electric motor 30.

3) The induced voltage for moving movable sheave half 21*b* is in linear correlation to the rate of change in the transmission ratio of transmission mechanism 20*a*.

From the above findings by the inventor, the heat value of electric motor 30 is estimated using equation (1) below:

[Equation 1]

$$\int \beta \{V_A - \alpha \cdot (dr/dt)\}^2 \cdot dt \qquad (1)$$

where $\beta$: a constant.

$V_A$: effective voltage applied to electric motor 30.

$dr/dt$: rate of change in the transmission ratio of transmission mechanism 20*a*.

$\alpha$: a constant, or a factor expressed with the following equation (3a) or (3b):

$$\alpha = [d\{f(l)\}/dl]^{-1} \qquad (3a)$$

$$\alpha = [d\{g(r)\}/dr] \qquad (3b)$$

where f(l): a function of distance l representing the transmission ratio.

r: transmission ratio.

g(r): a function of transmission ratio r, or an inverse function of the above function f(l).

In this embodiment, equations (3a) and (3b) are equal to each other.

In this embodiment, because electric motor 30 is controlled as described above by pulse width modulation, $V_A$ in equation (1) is expressed with equation (2) below:

$$V_A = V_P \cdot (DUTY) \qquad (2)$$

where $V_P$: magnitude of pulse voltage applied to electric motor 30.

DUTY: duty ratio of pulse voltage applied to electric motor 30.

Therefore, equation (1) may be transformed from equation (2) into the following equation (4):

[Equation 4]

$$\int \beta \{V_P(DUTY) - \alpha \cdot (dr/dt)\}_2 dt \qquad (4)$$

where $\beta$: a constant.

$V_P$: magnitude of pulse voltage applied to electric motor 30.

DUTY: duty ratio of pulse voltage applied to electric motor 30.

$\alpha$: a constant, or a factor expressed with the following equation (3a) or (3b):

$$\alpha = [d\{f(l)\}/dl]^{-1} \qquad (3a)$$

$$\alpha = [d\{g(r)\}/dr] \qquad (3b)$$

where f(l): a function of distance l representing the transmission ratio.

r: transmission ratio.

g(r): a function of transmission ratio r, or an inverse function of the above function f(l).

According to this embodiment, the heat value of electric motor 30 is estimated as described below using equation (4). The rate of change in the transmission ratio of transmission mechanism 20*a* is calculated from the distance l detected with sheave position sensor 40.

Figure 6:
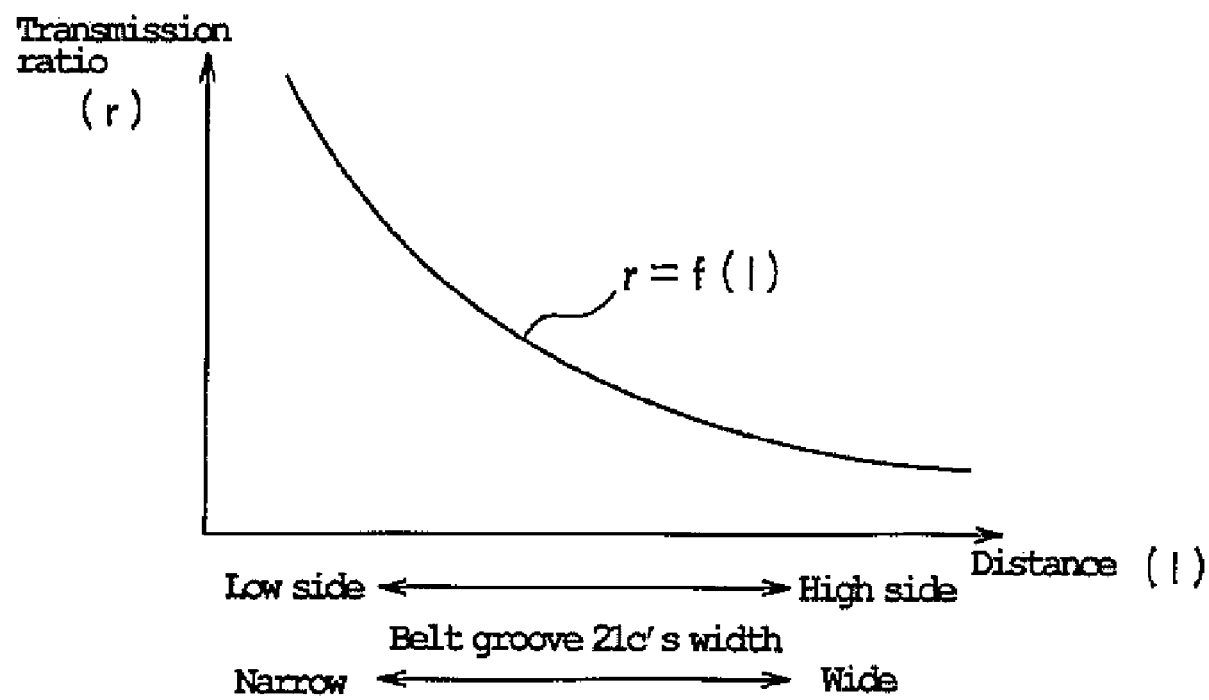
FIG. 6 is a graph of the function r=f(l) as an example of the invention.

In equation (4), the function r=f(l) is determined according to the shapes of belt groove 21*c* and belt groove 22*c*. For example, as shown in FIG. 6, the function r=f(l) may be a downward convex exponential function. In other words, the function r=f(l) may be set so that the change in transmission ratio r relative to the change in distance l becomes gentler as distance l increases and the width of belt groove 21*c* increases. In other words, the function r=f(l) may be set so that the change in transmission ratio r relative to the change in distance l becomes gentler as the transmission ratio changes toward the high side. In this case, the value a in equation (4) tends to be smaller as distance l increases.

Figure 7:
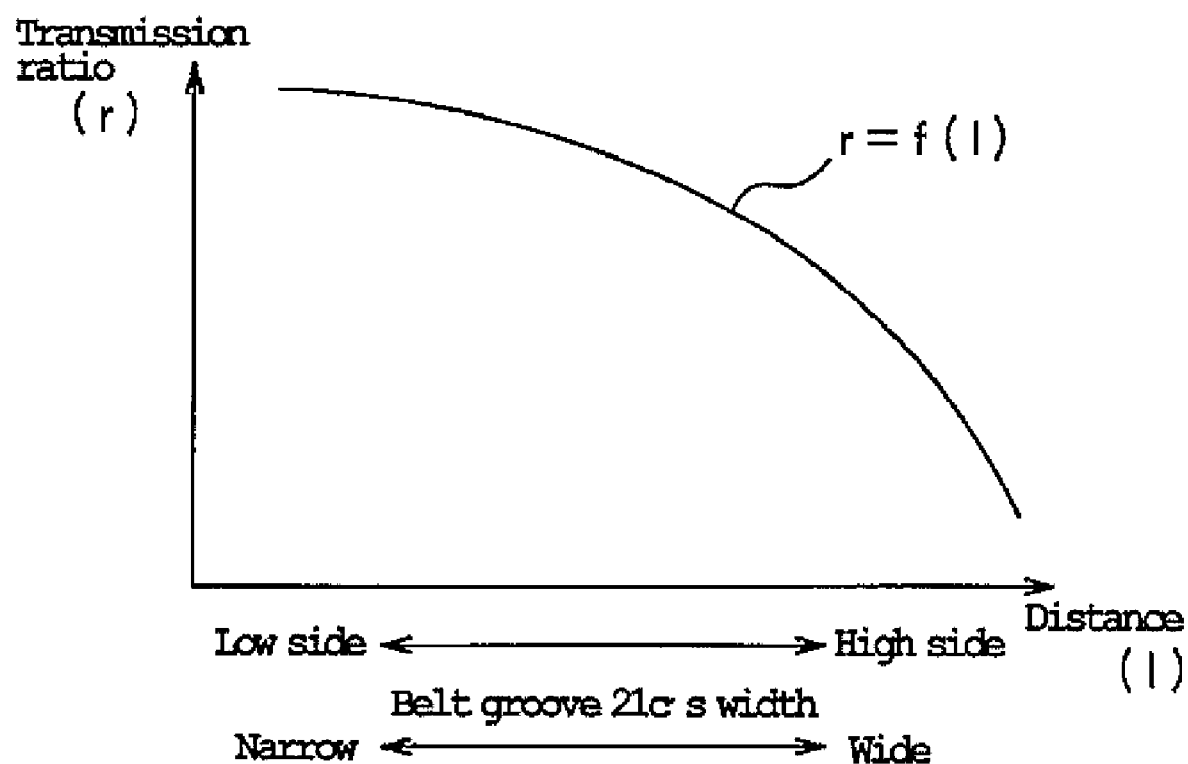
FIG. 7 is a graph of the function r=f(l) as another example of the invention.

Or, the function r=f(l) may be an upward convex exponential function, as shown in FIG. 7 as another example. In other words, function r=f(l) may be set so that the change in transmission ratio r relative to the change in distance l becomes steeper as distance l increases and the width of belt groove 21*c* increases. In other words, the function r=f(l) may be set so that the change in transmission ratio r relative to the change in distance l becomes steeper as the transmission ratio changes toward the high side. In this case, the value a in equation (4) tends to be greater as distance l increases.

Figure 8:
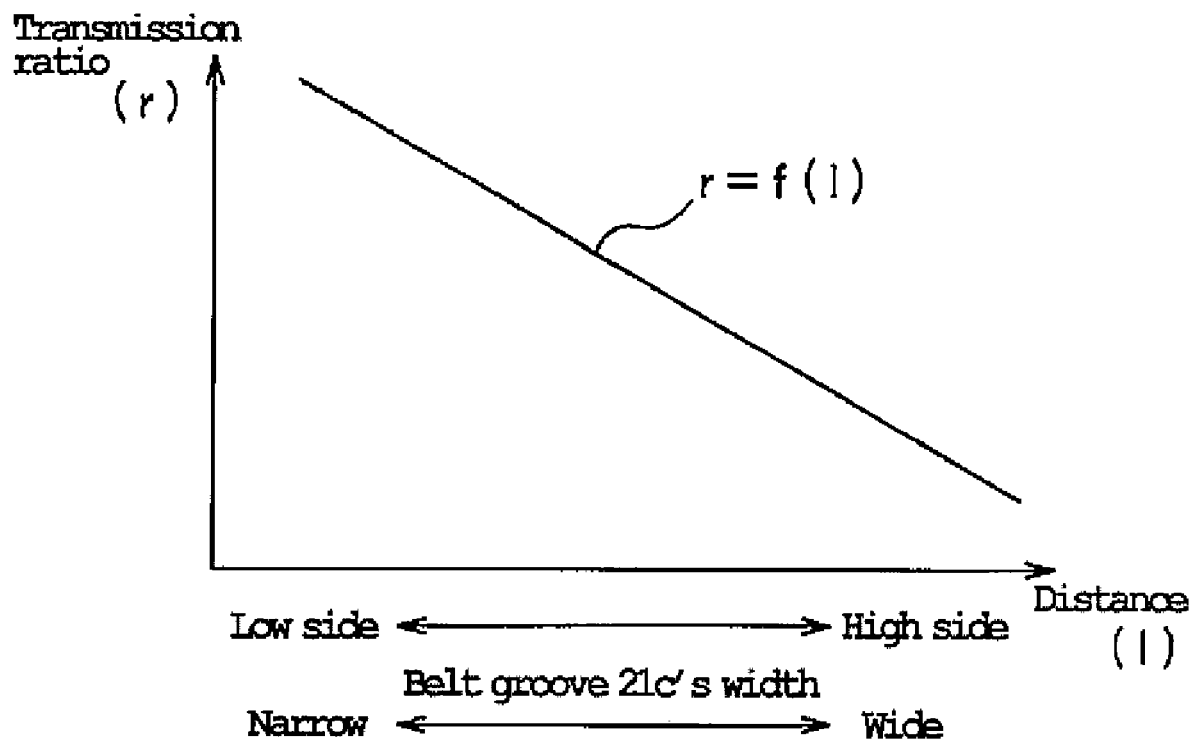
FIG. 8 is a graph of the function r=f(l) as still another example of the invention.

Further, the function r=f(l) may also be linear, as shown in FIG. 8 as another example. In other words, the function r=f(l) may be set to be constant irrespective of the values of distance l and belt groove 21*c*. In other words, the function r=f(l) may be set to be constant irrespective of the transmission ratio. In this case, the value $\alpha$ in equation (4) remains constant irrespective of distance l. That is, a is a constant.

(Method of Estimating the Heat Value of Electric Motor 30 and Method of Controlling Electric Motor 30)

Figure 9:
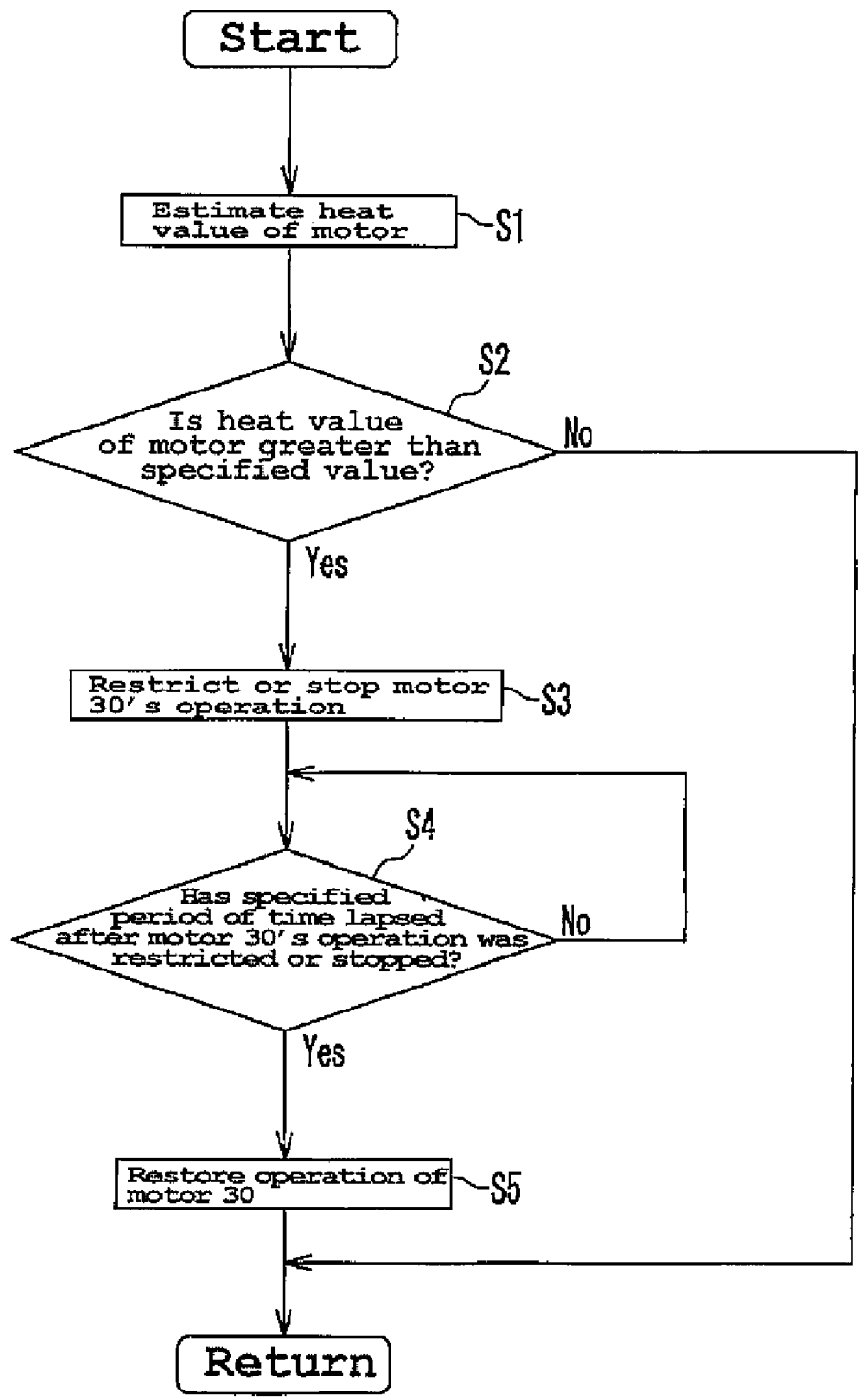
FIG. 9 is a flowchart showing a method of estimating the heat value of the electric motor and a method of controlling the electric motor according to the invention.

FIG. 9 is a flowchart of a method of estimating the heat value of electric motor 30 and a method of controlling electric motor 30. In step S1, the heat value of electric motor 30 is estimated using equation (4) above.

In step S2, it is determined whether the heat value of electric motor 30 estimated in step S1 is greater than a specified value. Because the heat value of electric motor 30 is in correlation to the temperature of electric motor 30, in general, the greater the heat value of electric motor 30, the higher is the temperature of electric motor 30. Therefore, whether the temperature of electric motor 30 is above a specified value can alternatively be determined according to the determination in step S2 of whether the estimated heat value of electric motor 30 is greater than a specified heat value. In other words, step S2 essentially determines whether the temperature of electric motor 30 is above a specified value.

The specified heat value in step S2 is appropriately set according to characteristics of electric motor 30 and driving circuit 8. For example, the specified heat value may be set to a value at which deterioration in performance is estimated to occur in electric motor 30 and driving circuit 8. In other words, the specified heat value may be set to a value above which the temperature of electric motor 30 is estimated to exceed a permissible use limit.

When the heat value of electric motor 30 is determined to be greater than the specified heat value in step S2, operation of electric motor 30 is restricted or stopped in step S3.

Step S4 then determines whether a specified period of time has lapsed after operation of electric motor 30 was restricted or stopped. In other words, it is determined whether a specified period of time has lapsed after the restriction or stop of operation of electric motor 30 such that the temperature of electric motor 30 has lowered sufficiently. Thus, the specified period of time may be specified as a period of time required to lower the temperature of electric motor 30 sufficiently. The time required to lower the temperature of electric motor 30 sufficiently varies according to the control made in step S3. For example, when operation of electric motor 30 is stopped, the temperature of electric motor 30 lowers relatively quickly, so the specified period of time may be specified to be relatively short.

When it is determined in step S4 that the specified period of time has not lapsed after restricting or stopping the operation of electric motor 30, the process returns to step S4. On the other hand, when the specified period of time has lapsed after restriction or stop of operation of electric motor 30, operation of electric motor 30 is restored in step S5 to the state before the restriction or stop made in step S3.

When it is determined in step S2 that the heat value of electric motor 30 is less than the specified value, the process ends without performing steps S3-S5.

The control of restricting or stopping operation of electric motor 30 in step S3 is not limited to a specific one as long as the heat value of electric motor 30 becomes smaller than that in normal operation of electric motor 30. For example, operation of electric motor 30 may be stopped. In other words, changing the transmission ratio may be restricted. Further, for example, at least one of the upper limit of rotational speed and the upper limit of torque of electric motor 30 may be lowered. In other words, the upper limit of the rate of change in the transmission ratio of transmission mechanism 20a may be lowered. That is, in the case of a control in which the rate of change in the transmission ratio of transmission mechanism 20a exceeds its upper limit, the rate of change in the transmission ratio is restricted to the upper limit speed. Further, for example, the permissible rotational speed range of electric motor 30 may be narrowed. In other words, the permissible range of the transmission ratio of transmission mechanism 20a may be narrowed. Further, for example, action that changes the transmission ratio suddenly such as a kick-down action may be made ineffective. Specifically, ECU 7 may not output pulse width modulation signals of great duty ratios.

(Functions and Effects)

In this embodiment, the heat value of electric motor 30 is estimated from the rate of change in the transmission ratio of transmission mechanism 20a. Thus, the heat value of electric motor 30 is estimated using the rate of change in the transmission ratio obtained by differentiating by time the transmission ratio detected with the sensor normally provided in transmission mechanism 20a for measuring the transmission ratio. Specifically, the heat value of electric motor 30 is estimated using the rate of change in the transmission ratio calculated from the distance l detected with sheave position sensor 40. Therefore, the heat value of electric motor 30 is estimated with an inexpensive, simple constitution without using additional sensors such as temperature and current sensors.

When the heat value of electric motor 30 exceeds the specified heat value and the temperature of electric motor 30 is estimated to have risen beyond the permissible use temperature range of electric motor 30, operation of electric motor 30 is restricted or stopped. This restricts electric motor 30 from being heated up above the permissible use temperature range. As a result, deterioration in performance and damage of electric motor 30 and driving circuit 8 are effectively restricted.

In particular, when operation of electric motor 30 is restricted by lowering the upper limit of the rate of change in the transmission ratio of transmission mechanism 20a, although the change in the transmission ratio becomes slow, this is preferable because the transmission ratio is changed according to vehicle speed and the maneuvering of motorcycle 1 is less affected.

Also with this embodiment, when a specified period of time lapses after restriction or stop of operation of electric motor 30, operation of electric motor 30 is restored to the state before the restriction or the stop. Therefore, when the specified period of time lapses after restriction or stop of operation of electric motor 30, and the temperature of electric motor 30 is estimated to have lowered within the permissible use temperature range, operation of electric motor 30 becomes normal. In this way, electric motor 30 is restricted or stopped only when required, otherwise, electric motor 30 is operated swiftly and the transmission ratio is changed at relatively high speeds. As a result, a high quality of drivability is realized.

Other Variation Examples

Transmission mechanism 20a is not limited to a belt type ECVT and may be, for example, a toroidal type ECVT. Further, transmission mechanism 20a may be of a type other than a CVT. That is, the type of transmission mechanism 20a is not restricted as long as it is electronically controlled. However, because reverse drive of electric motor 30 occurs frequently in the ECVT, this invention is especially effective for an ECVT.

Where motorcycle 1 uses electric motor 30 controlled by PWM and transmission mechanism 20a is a belt type ECVT, as in the embodiment above, the heat value of electric motor 30 may be estimated using equation (4). Where electric motor 30 is not controlled by PWM or transmission mechanism 20a is not a belt type ECVT, the heat value of electric motor 30 can be estimated using equation (1). In that case, equation (1) may be transformed according to transmission mechanism 20a. In other words, equation (1) can be applied commonly to any transmission mechanism 20a as long as it is electronically controlled to change the transmission ratio using an electric motor. The heat value of electric motor 30 can be estimated using equation (1) irrespective of the type of transmission mechanism 20a. Therefore, the type of transmission mechanism 20a is not restricted as long as it is electronically controlled using an electric motor.

The vehicle of this invention may be other than a scooter type of motorcycle such as, for example, an off-road type, motorcycle type, scooter type, or moped type. Further, the vehicle of the invention may be a straddle type vehicle other than a motorcycle such as, for example, and all-terrain vehicle (ATV). Furthermore, the vehicle of the invention may be other than a straddle type vehicle such as a four-wheeled vehicle.

While the above embodiment is provided with internal combustion engine 10, a driving source other than an engine may be used. For example, an electric motor may be provided in place of engine 10.

Electric motor 30 is not limited to control by PWM. For example, electric motor 30 may be controlled by pulse amplitude modulation (PAM). Motor 30 may be a stepper motor.

(Definition of Terms Used Herein)

The term "specified heat value" in step S2 is appropriately specified according to characteristics of electric motor 30 and driving circuit 8. For example, the "specified heat value" may be specified to a value above which deterioration in performance of electric motor 30 and driving circuit 8 is estimated to occur. In other words, the "specified heat value" may be specified to a value above which it is estimated that the temperature of electric motor 30 exceeds a permissible use temperature range of electric motor 30.

The "specified period of time" in step S4 is appropriately specified according to the details of control performed in step S3 for restricting or stopping operation of electric motor 30. For example, the "specified period of time" in step S4 may be specified to a period of time after restriction or stop of operation of electric motor 30 in which the temperature of electric motor 30 is determined to have lowered into the permissible use temperature range of electric motor 30.

The phrase "the distance between movable sheave half 22b and stationary sheave half 22a" is the distance between a specific point on movable sheave half 22b and a specific point on stationary sheave half 22a. Those specific points may be arbitrarily set as long as each of them is determined with a single meaning. For example, as shown in FIG. 3, "the distance between movable sheave half 22b and stationary sheave half 22a" may be defined to be the distance between the outermost radial end of movable sheave half 22b and the outermost radial end of stationary sheave half 22a.

The term "the magnitude of the pulse voltage" means the magnitude of the input pulse voltage.

The term "effective voltage" means the voltage obtained by multiplying the input pulse voltage by duty ratio.

This invention is effective in vehicles provided with an ECVT.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A control apparatus for a transmission mechanism, the transmission mechanism comprising an electric motor for changing a transmission ratio between input and output shafts, wherein the control apparatus estimates a heat value of the electric motor from a rate of change in the transmission ratio.

2. The control apparatus of claim 1, wherein operation of the electric motor is restricted or stopped when the estimated heat value of the electric motor reaches or exceeds a specified value.

3. The control apparatus of claim 2, wherein operation of the electric motor is restricted by lowering an upper limit of rate of change in the transmission ratio when the estimated heat value of the electric motor reaches or exceeds a specified value.

4. The control apparatus of claim 2, wherein operation of the electric motor is restricted by narrowing a permissible range of the transmission ratio when the estimated heat value of the electric motor reaches or exceeds a specified value.

5. The control apparatus of claim 2, wherein operation of the electric motor is resumed after a lapse of a specified time from the restriction or stop of the electric motor operation.

6. The control apparatus of claim 1, wherein the heat value of the electric motor is estimated using the following equation (1):

$$\int \beta \{V_A - \alpha \cdot (dr/dt)\}^2 \cdot dt \quad (1)$$

where $\beta$: a constant $V_A$: effective voltage applied to the electric motor $dr/dt$: rate of change in the transmission ratio $\alpha$: a constant that is expressed with the following equation (3b):

$$\alpha = [d\{g(r)\}/dr] \quad (3b)$$

where $g(r)$: a function of transmission ratio r.

7. The control apparatus of claim 6, further comprising a driving circuit for applying an impulse voltage to the electric motor and meeting the following equation (2):

$$V_A = V_P \cdot (DUTY) \quad (2)$$

where $V_P$: magnitude of the impulse voltage

DUTY: duty ratio of the impulse voltage.

8. The control apparatus of claim 1, wherein:

the transmission mechanism comprises a V belt routed around a primary sheave provided on the input shaft and a secondary sheave provided on the output shaft;

the primary sheave comprises a stationary sheave half and a movable sheave half opposing the stationary sheave half and displaceable in an input shaft axis direction, the movable sheave half and stationary sheave half constituting a V groove through which the V belt is routed;

the electric motor changes the transmission ratio by displacing the movable sheave half relative to the stationary sheave half to change a width of the V groove; and the heat value of the electric motor is estimated using the following equation (1);

$$\int \beta \{V_A - \alpha \cdot (dr/dt)\}^2 \cdot dt \quad (1)$$

where $\beta$: a constant $V_A$: effective voltage applied to the electric motor $dr/dt$: rate of change in the transmission ratio $\alpha$: a constant that is expressed with the following equation 3(a) or (3b):

$$\alpha = [d\{f(l)\}/dl]^{-1} \quad (3a)$$

$$\alpha = [d\{g(r)\}/dr] \quad (3b)$$

where f(l): a function of l representing the transmission ratio g(r): a function of transmission ratio, an inverse function of the function f(l).

9. The control apparatus of claim 8, where a increases with an increase in the distance l.

10. The control apparatus of claim 8, where a decreases with an increase in the distance l.

11. The control apparatus of claim 8, where a is constant irrespective of the distance l.

12. A transmission comprising:
a transmission mechanism comprising an electric motor for changing a transmission ratio between input and output shafts, and
a control section for estimating a heat value of the electric motor based on the rate of change in the transmission ratio.

13. A vehicle comprising the transmission of claim 12.

14. A control method for a transmission mechanism comprising an electric motor for changing a transmission ratio between input and output shafts, the control method comprising:
estimating a heat value of the electric motor based on a rate of change in the transmission ratio.

15. The control method of claim 14, further comprising:
restricting or stopping operation of the electric motor when the estimated heat value of the electric motor reaches or exceeds a specified value.

16. The control method of claim 15, further comprising:
resuming operation of the electric motor after lapse of a specified time from the restriction or stop of the electric motor.

17. The control method of claim 14, wherein the heat value of the electric motor is estimated using the following equation (1):

$$\int \beta \{V_A - \alpha \cdot (dr/dt)\}^2 \cdot dt \tag{1}$$

where $\beta$: a constant $V_A$: effective voltage applied to the electric motor dr/dt: rate of change in the transmission ratio $\alpha$: a constant that is expressed with the following equation (3b):

$$\alpha = [d\{g(r)\}/dr] \tag{3b}$$

where g(r): a function of transmission ratio r.

18. The control method of claim 17, wherein a driving circuit applies an impulse voltage to the electric motor meeting the following equation (2):

$$V_A = V_p \cdot (DUTY) \tag{2}$$

where $V_p$: magnitude of the impulse voltage

DUTY: duty ratio of the impulse voltage.

19. A method of estimating a heat value of an electric motor in a transmission mechanism comprising an electric motor for changing a transmission ratio between input and output shafts, the method comprising:
estimating the heat value of the electric motor based on a rate of change in the transmission ratio.

* * * * *